US00RE36196E

United States Patent [19]

Eberhardt

[11] E Patent Number: Re. 36,196

[45] Reissued Date of Patent: Apr. 27, 1999

[54] AIR SUPPLY SYSTEM FOR FIREFIGHTING APPARATUS

[75] Inventor: H. Alfred Eberhardt, Marco Island, Fla.

[73] Assignee: Hale Products, Inc., Conshohocken, Pa.

[21] Appl. No.: 08/587,512

[22] Filed: Jan. 17, 1996

Related U.S. Patent Documents

Reissue of:

[64] Patent No.: 5,145,014
Issued: Sep. 8, 1992
Appl. No.: 07/636,079
Filed: Dec. 28, 1990

[51] Int. Cl.[6] ..... A62C 5/02

[52] U.S. Cl. ..... 169/14; 169/13; 169/15; 169/24

[58] Field of Search ..... 169/14, 15, 24, 169/44, 13

[56] References Cited

U.S. PATENT DOCUMENTS

| | | | |
|---|---|---|---|
| 2,249,095 | 7/1941 | Swift et al. | 169/14 X |
| 2,758,547 | 8/1956 | Wendell et al. . | |
| 2,769,500 | 11/1956 | Clifford | 169/15 |
| 2,934,149 | 4/1960 | Bedford et al. | 169/15 |
| 2,936,835 | 5/1960 | Sheppard | 169/14 |
| 3,846,515 | 11/1974 | Williamson . | |
| 4,337,380 | 6/1982 | Eberhardt . | |
| 4,337,830 | 7/1982 | Eberhardt . | |
| 4,345,654 | 8/1982 | Carr | 169/14 X |
| 4,981,178 | 1/1991 | Bundy | 169/13 X |
| 5,096,389 | 3/1992 | Grady . | |

FOREIGN PATENT DOCUMENTS

| | | | |
|---|---|---|---|
| 917765 | 9/1954 | Austria | 169/15 |
| 2608438 | 6/1988 | France | 169/14 |
| 20814 | of 1909 | United Kingdom | 169/24 |
| 796055 | 6/1958 | United Kingdom . | |

OTHER PUBLICATIONS

Publication Disclosure of W.S. Darley & Company's Type SH Champion Fire Pump, Date Unknown but reference is admitted prior art to the present appliction.

W. S. Darley & Co., *Darley Champion—SEH, Fire Pumps* Jun. 1981.

Hale Fire Pump Company, *2HPC Pump Air Clutch Assembly*, Plate No. 704, Oct. 23, 1989.

Hale Fire Pump Company, *Hale Type Pump*, Plate No. 360, Jul. 8, 1953.

Hale Fire Pump Company, *Hale Type ZM Pump*, Plate No. 120, Jan. 15, 1936.

Article: "Foam A Fire Suppressant: An Evaluation" by Schlobohm and Rochna, published 1987.

Article from "The Fireman" entitled "Merryweather Fire Fighting Equipment on Trinity House Vessel'Patricia'", published 1938.

Article: "Engineering Analysis of Threshold Compressed Air Foam Systems (CAFS)" by Dan McKenzie, published 1987.

*Primary Examiner*—Gary C. Hoge
*Attorney, Agent, or Firm*—Hill & Simpson

[57] ABSTRACT

A system for supplying compressed air and foam to produce a fire stream comprising an aerated foam is disclosed. The system includes an air compressor driven from a split shaft gear box of the type provided on fire trucks.

25 Claims, 4 Drawing Sheets

AIR SUPPLY SYSTEM FOR FIREFIGHTING APPARATUS

Matter enclosed in heavy brackets [ ] appears in the original patent but forms no part of this reissue specification; matter printed in italics indicates the additions made by reissue.

BACKGROUND AND SUMMARY OF THE INVENTION

This invention relates generally to an air supply system for firefighting apparatus, and more particularly to a system for supplying compressed air and foam to produce a fire stream comprising an aerated foam.

Air supply systems of the above-indicated type are known and are referred to in the art by the terms CAFS (compressed air foam system) and WEPS (water expansion pumping system). A typical system includes a foam injection system, a water pumping system and an air compressor. When employing mixture ratios of 1 cfm of air to 1 gpm of water, these systems can produce very desirable results in firefighting by the use and application of "Class A" foams to help achieve fire suppression and to deal with increased fire loads and related hazards.

It is the general object of the invention to provide an air supply system of the indicated type including means for driving an air compressor using a split shaft gear box of the type commonly employed on fire trucks. More specifically, the air compressor is mounted on the housing of the gear box in a manner so that a shaft extension of the air compressor is contained in the gear box to be driven by a gear which also drives the fire pump that is also mounted on the fire truck adjacent the gear box.

In accordance with another object of the invention the drive for the compressor is provided with a clutch which allows for the selective use of the compressor.

More specifically, the air supply system in accordance with the invention comprises a rotary vane compressor mounted on the split shaft gear box of the midship pump provided on a fire truck. By this arrangement, compressed air can be introduced into the water stream to make an aerated foam, which foam is more effective as a fire stream than plain water and penetrates faster.

Another feature of the air supply system in accordance with the invention is that by introducing air into the fire hose, the actual weight of the hose is significantly reduced. Thus, it makes handling a 2½ inch fire hose become a one man job instead of requiring two or three men to handle the hose.

Furthermore, the booster tank provided on the fire truck as a water supply for immediate use at a fire scene can be used over a longer time period since the water supply can be stretched. This makes the fire truck apparatus more effective in that the first fire truck to arrive at a fire scene can be used to apply a fire stream to the fire for a longer time period to limit the fire damage until a subsequent fire truck can be hooked up to the hydrant and supply an additional fire stream.

DETAILED DESCRIPTION OF THE PREFERRED EMBODIMENT

Figures 4, 5:
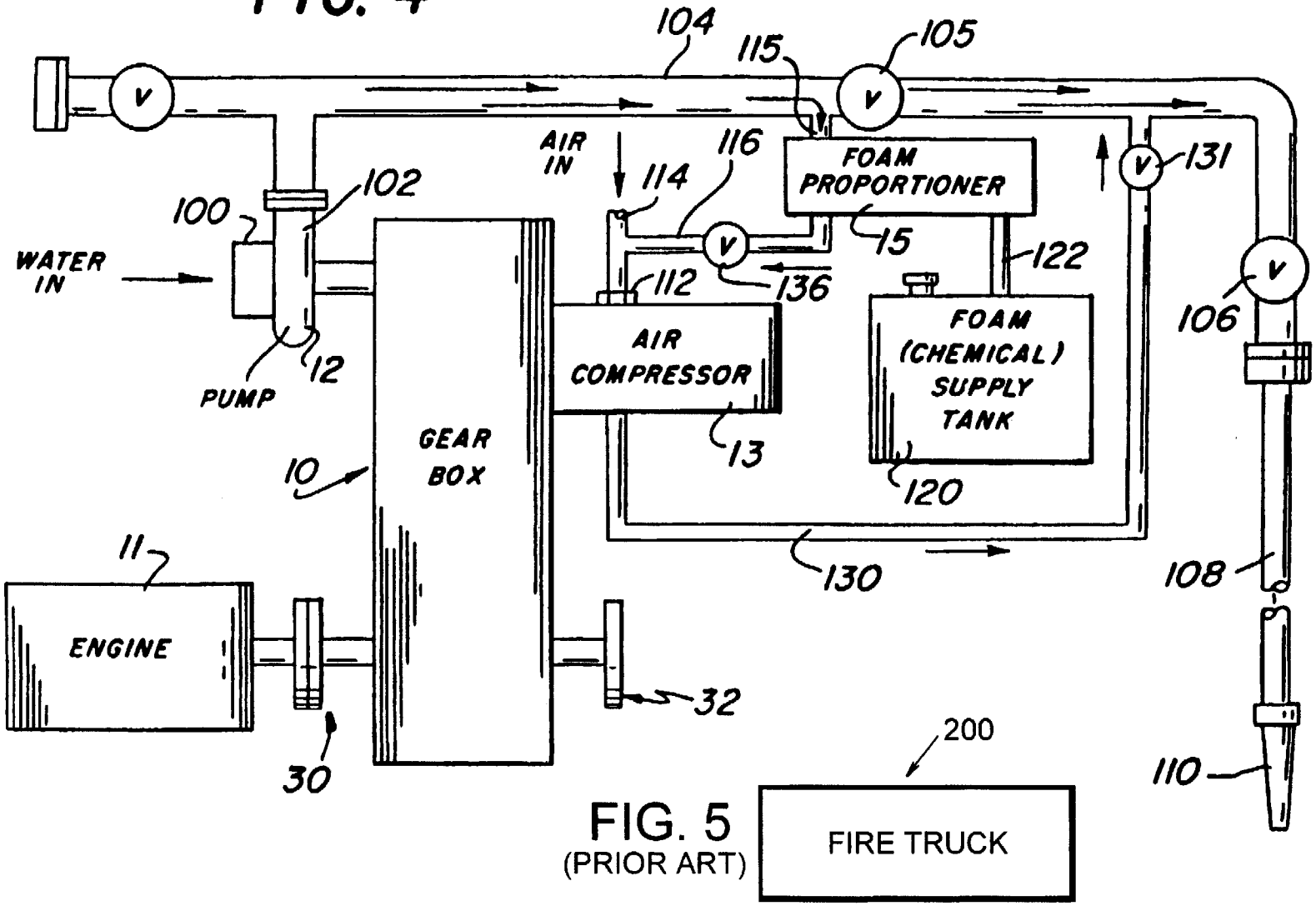
FIG. 5 (PRIOR ART)
FIG. 4 is a schematic view of an air supply system in accordance with the invention.
*FIG. 5 is a side view of a fire truck for incorporating the air supply system in accordance with the invention.*

The main components of the air supply system of the invention are a transmission means 10, a fire pump 12, an air compressor 13 and a foam proportioner 15, which components are arranged in the manner shown in FIG. 4 to provide a compressed air foam system in accordance with the invention.

The transmission means 10 comprises a split shaft gear box of the type used on fire trucks as the transmission for driving the midship fire pump provided thereon. Fire pump 12 is a midship pump of the type used on fire trucks and may comprise, by way of example, a QG 150 midship pump manufactured by Hale Fire Pump Company. Fire pump 12 is a two-stage centrifugal pump which operates to provide, by way of example, one to two thousand GPM at 150 PSI and has impellers 14 and 16 mounted on a rotating pump shaft 18 driven by a pump shaft drive gear 20 which is mounted within an upper housing portion 22 of the gear box 23 of transmission means 10. The housing 19 of fire pump 12 is mounted on a housing portion 22 of the gear box 23 of transmission means 10 to be adjacent thereto by suitable mounting bolts as is conventional. *The fire pump provides water to the fire stream at a desired operating pressure of multiple atmospheres and the operating pressure is at least about 100 to 150 psi.*

The transmission means 10 for driving the fire pump 12 is essentially the same as the transmission shown in U.S. Pat. No. 4,587,862 which discloses a split shaft gear box of the type in use today on fire trucks for driving fire pumps. Briefly, this type of pump transmission in use today comprises an input flange keyed to an input shaft, an output flange keyed to an output shaft and a sliding gear which slides between a "ROAD" position and a "PUMP" position. The input flange is connected to the transmission on the fire truck engine to be driven thereby and to cause rotation of the input shaft keyed thereto. The output flange is connected to the rear wheels of the fire truck for driving the same. The sliding gear is slidable axially on a splined portion of the input shaft. In the "ROAD" position of the sliding gear, its gear teeth are engaged with internally facing gear teeth formed in a collar that is part of the output shaft.

In this manner, torque is transmitted from the input shaft to the output shaft which has its output flange connected to the rear wheels of the fire truck for driving the same.

In the "PUMP" position of the sliding gear, its teeth are engaged with the driving or intermediate gear which drives the pump, which is mounted adjacent to the pump transmission.

Figure 3:
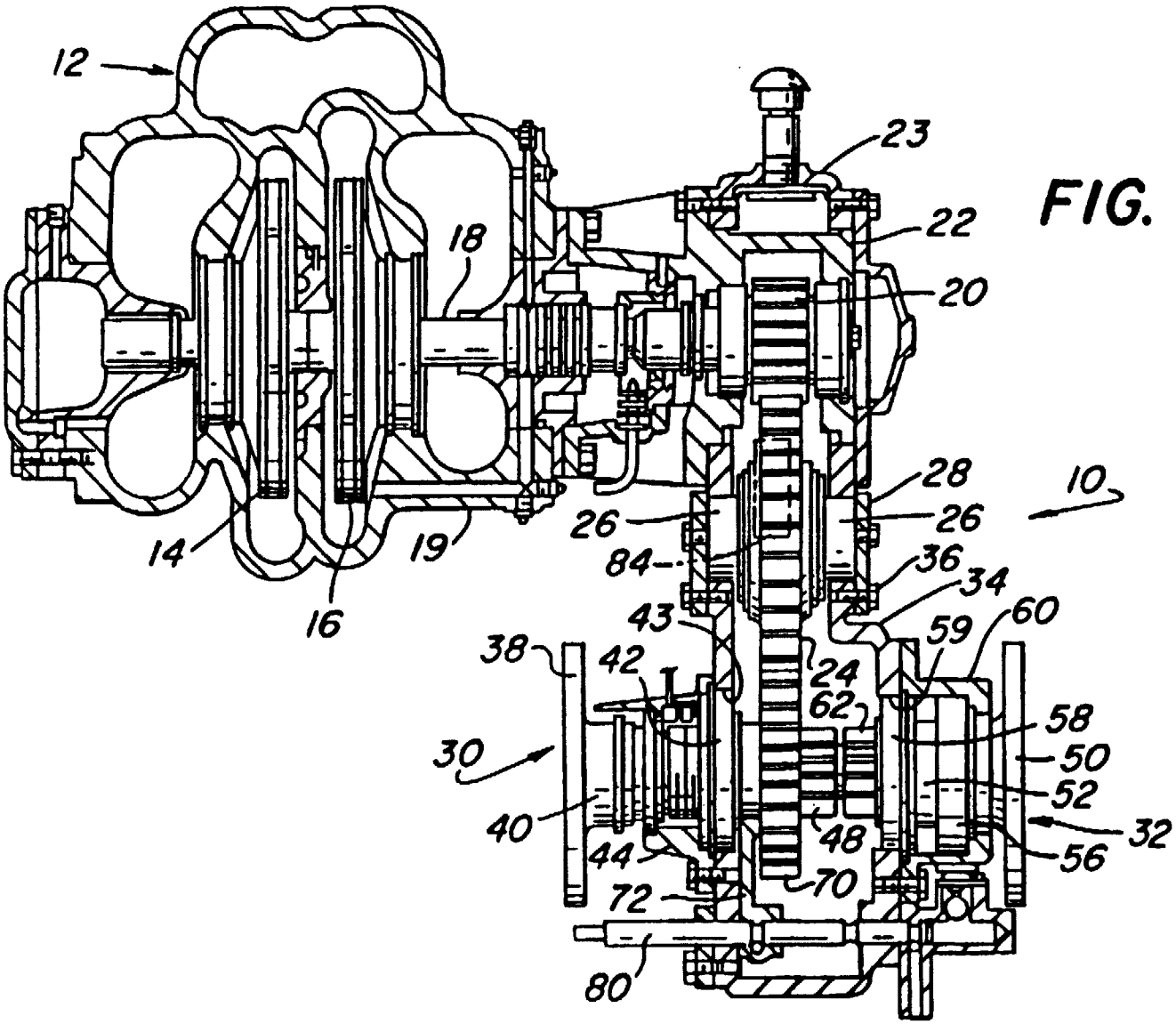
FIG. 3 is a sectional view taken generally on line 3—3 of FIG. 2.

Referring to FIG. 3, transmission 10 comprises an input member 30 and an output member 32 rotatably mounted in axial end-to-end alignment in a gear box lower housing 34 which is mounted below a gear box middle housing 28 by means of suitable mounting bolts 36. The intermediate gear 24 is rotatably mounted on housing 28 by bearing 26 contained therein. Input member 30 comprises an input flange portion 38 and a shaft portion 40. Shaft portion 40 is rotatably mounted in housing 34 by means of roller bearing means 42 contained in an opening 43 in housing 34 and enclosed by a cover 44. The portion of shaft portion 40 extending from bearing 42 into the interior of housing 34 is cylindrical and has an externally formed involute splined portion 48.

Output member 32 comprises an output flange portion 50 and a shaft portion 52. Shaft portion 52 is rotatably mounted in housing 34 by means of a pair of roller bearings 56 and 58 contained, respectively, within an opening 59 in housing 34 and a cover 60 as shown in FIG. 3. The portion of shaft portion 52 extending inwardly from bearing 58 into the interior of housing 34 and to a location adjacent spline portion 48 is cylindrical and has an externally formed involute splined portion 62 of the same tooth configuration as the splined portion 48. The bearing supports for the shaft portions 40 and 52 of input member 30 and output member 32 are constructed and arranged so that the splined portions 48 and 62 are in axial alignment.

Figure 2:
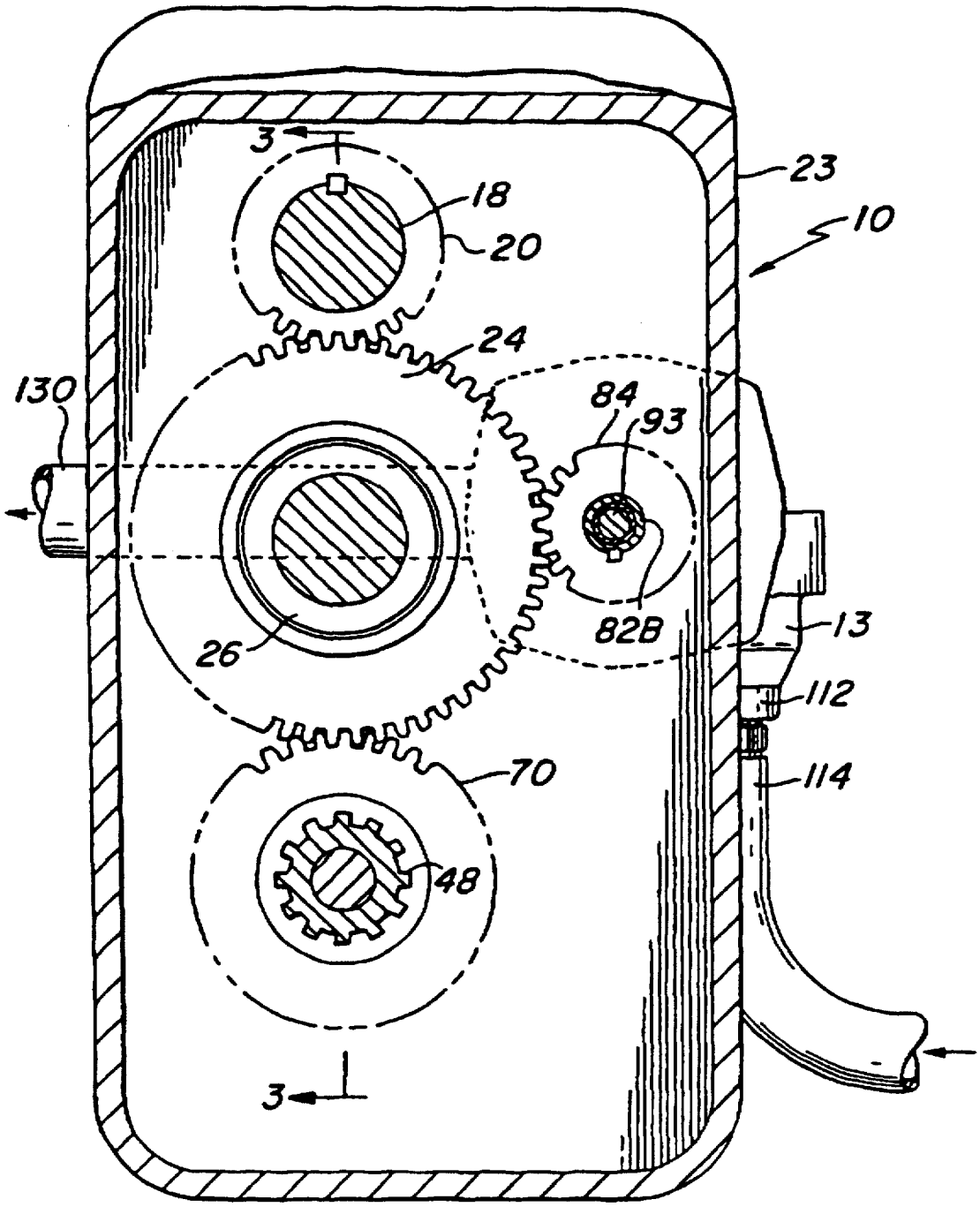
FIG. 2 is a sectional view taken generally on line 2—2 of FIG. 1.

A sliding input gear 70 is mounted on splined portion 48 of input member 30 and comprises an internal involute splined portion constructed so that the sliding gear 70 is slidable axially on splined portion 48. Sliding gear 70 is provided with external teeth adapted to drivingly engage the gear teeth of the intermediate gear 24. Sliding gear 70 is constructed and arranged to cooperate with the splined portions 48 and 62 of input member 30 and output member 32, respectively, to slide between a "ROAD" position wherein the internal splined portion of sliding gear 70 is in engagement with both splined portions 48 and 62 and a "PUMP" position wherein the internal splined portion of sliding gear 70 only engages the splined portion 48 of input member 30. In the "PUMP" position shown in solid lines in FIG. 2, the external gear teeth of sliding gear 70 engages gear teeth of intermediate gear 24 for causing rotation thereof whereby gear 24 drives the pump shaft 18 through pump drive gear 20 to cause rotation of the pump impeller 16 and the pumping of water through the fire pump 12. In the "ROAD" position of sliding gear 70 the internal splined portion of gear 70 engages both splined portions 48 and 62 of input member 30 and output member 32, respectively.

As is conventional, there is also provided a "NEUTRAL" portion of the sliding gear 70 wherein the external gear teeth thereof are not in driving engagement with intermediate gear 24 and the internal splined portion of sliding gear 70 is engaged with the splined portion of input member 30 only.

As is conventional, means are provided for actuating sliding gear 70 between the "PUMP", "NEUTRAL" and "ROAD" positions thereof as described above. The actuating means comprises a gear shaft 80 mounted in openings in housing 34 for sliding movement horizontally beneath sliding gear 70. An actuater arm 72 is carried on shaft 80 and extends upwardly therefrom to engage sliding gear 70 in a recessed portion thereof. Suitable means, either manual or power operated, are engaged with shaft 80 to actuate the same between the operating positions thereof as described above. As the shaft 80 is moved back and forth between these positions, a detent mechanism operates to frictionally secure the shaft 80 in the "PUMP" position and the "ROAD" position.

Air compressor 13 is preferably a sliding-vane-type rotary compressor of a conventional construction comprising compressor shaft means including a drive shaft portion 82A on which a compressor rotor is mounted, the compressor rotor carrying radial vanes as is conventional in sliding-vane-type compressor construction. By way of example, compressor 13 is constructed to operate up to 500 cubic feet per minute *and to deliver air at relatively high pressure of at least several atmospheres to the water delivered to the fire stream.* For a purpose which will appear more fully hereafter, the compressor 13 is preferably constructed of corrosion resistant material, i.e., resistant to the foam producing chemicals and water that is used in the system in accordance with the invention. Thus, the compressor 13 may be constructed of hardened stainless steel with end plates of a tough bronze for resistance to wear from the vanes and resistance to the corrosion from the liquid and foam producing chemicals used in the system. Also, the compressor vanes are preferably of a low friction, strong plastic material.

Figure 1:
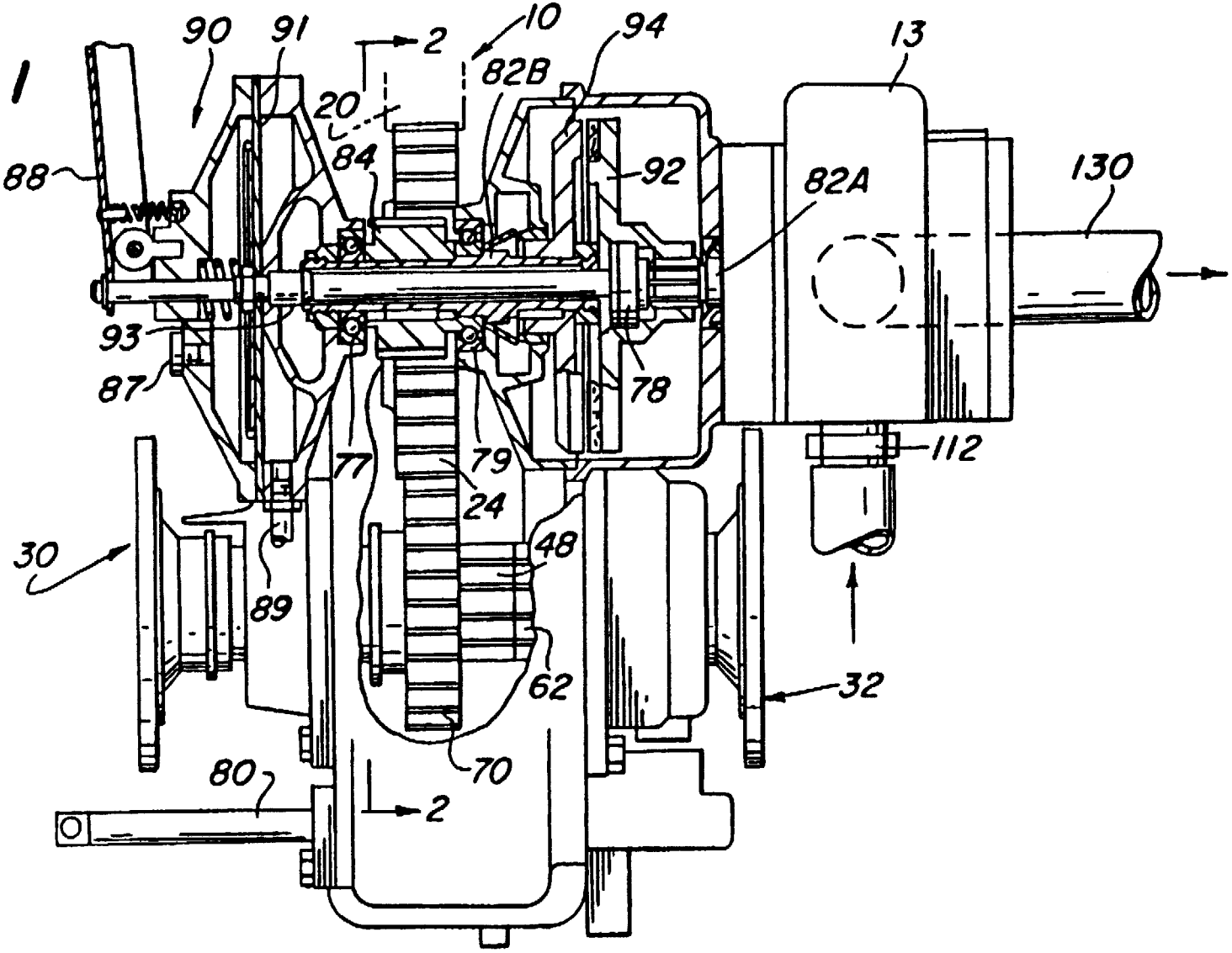
FIG. 1 is a fragmentary sectional view of part of the transmission means for use in the air supply system in accordance with the invention.

Means are provided for mounting compressor 13 on the middle housing 28 of the gear box 23 of transmission 10 means 10 on the side of gear box 23 opposite to fire pump 12. Such means comprises suitable mounting bolts which mount the compressor 13 with its drive shaft portion 82A arranged for access to the interior of the gear box 23 of the transmission means 10 as shown in FIG. 1. Transmission means 10 is constructed and arranged to drive the compressor shaft portion 82A by means of the intermediate gear 24 thereof which also drives the fire pump 12 as discussed above. To this end, a compressor drive gear 84 is keyed onto a compressor shaft portion 82B rotatably mounted within the interior of the gear box housing 28 and constructed and arranged to be driven by the intermediate gear 24. By this arrangement, as intermediate gear 24 is caused to be rotated by the input gear 70 of the transmission means 10, it functions to drive both the compressor drive gear 84 and the pump shaft drive gear 20. The compressor drive gear 84 causes the compressor shaft portions 82A and 82B to be rotated and this rotation is transmitted to the compressor rotor for operation of the compressor 13 as is conventional in the art.

The drive for the compressor 13 includes a clutch means 90 which allows selected use of the compressor 13 whereby the compressor 13 can be engaged only when air is needed for an operation such as the compressed air foam system of the invention. The clutch means 90 is shown in FIG. 1 and is of a conventional mechanical clutch construction which can be operated using either pressure air or vacuum. Also, the clutch means 90 may be operated by a manual lever 88 which is provided for manual operation under emergency conditions when the air supply control becomes inoperative. In the preferred embodiment of the invention, the clutch means 90 is operated by air pressure through a control line 89 which is controlled by a button-operated control valve (not shown) that directs air (such as from the air brake system of the fire truck) to one side of a spring-biased clutch diaphram 91, the other side thereof being vented at fitting 87. The diaphram 91 carries an actuator shaft 93 at its central portion, the actuator shaft 93 being mounted for axial movement within the interior of the compressor shaft portion 82B, which has a hollow construction to slidably receive said actuator shaft 93 as shown in FIG. 1. As discussed above, the compressor shaft means comprises a first shaft portion 82A extending from the compressor housing and arranged to carry the compressor rotor and a second shaft portion 82B which is mounted for rotation within the gear box housing in bearings 77 and 79 and has the compressor drive gear 84 mounted thereon and keyed thereto for causing rotation thereof. Shaft portion 82A has a splined external configuration adapted to be engaged with an internal splined portion of a clutch plate 92 mounted thereon for axial slidable movement relative thereto. Clutch plate 92 is carried on the right end (FIG. 1) of actuator shaft 93 at a bearing means 78 to be moved axially thereby and to rotate thereon. The clutch means 90 also comprises a rotating driving flange 94 which is keyed on the exterior of the compressor shaft 82B for rotation therewith and is arranged to face the clutch plate 92 for driving engagement thereby along the opposed cooperating faces of clutch plate 92 and flange 94, as is conventional in this type of clutch construction.

When it is desired to operate the air compressor 3, the clutch means 90 is engaged by the application of air pressure through the control line 89 to thereby move the diaphram 91 to the left as shown in FIG. 1. This movement of the diaphram 91 causes a corresponding movement of the actuator shaft 93 and the clutch plate 92 engaged on the end thereof to thereby move the clutch plate 92 into engagement with the rotating driving flange 94 at their cooperating faces. The parts are shown in the disengaged position in FIG. 1. In the engaged position, the rotation of the compressor drive gear 84 by the intermediate gear 24 causes rotation of the compressor drive shaft 82B and, by means of the engaged clutch plate 92 and flange 94, a corresponding rotation of the compressor shaft portion 82A whereby the compressor 13 is operated to cause rotation of its rotor to discharge compressed air from its discharge as is conventional in the art.

When the air compressor 13 is not needed, the clutch means 90 is decoupled by the removal of the air supplied through the line 89 whereby the diaphram 91 returns to a disengaged position under the action of its spring bias and moves to the right to the position shown in FIG. 1. This movement of the diaphram 91 causes a corresponding movement of the actuating shaft 93 and the clutch plate 92 engaged on the right end thereof to thereby disengage the clutch plate 92 from the rotating driving flange 94. Accordingly, the rotation of the compressor shaft portion 82B is no longer transmitted to the compressor shaft portion 82A and the compressor 13 will no longer operate.

The above-described clutch-type of driving arrangement is conventional in the art, and it will be apparent that various types of clutches may be utilized to accomplish the above-described operation of the compressor drive.

In FIG. 4 there is shown a compressed air foam system using an air supply means in accordance with the invention. This system includes the transmission means 10 which is driven from the engine 11 on the fire truck *200* (*FIG. 5*) and is arranged, as discussed above, to drive the fire pump 12 and the air compressor 13. The suction 100 of the fire pump is adapted to be connected to a water supply, such as a hydrant or a booster tank carried on the fire truck. The discharge 102 of the fire pump 12 is delivered through a manifolded discharge including a water delivery conduit 104 which is connected at its downstream end through a discharge valve 106 to a fire hose 108 which has a hose nozzle 110 at its downstream end for directing a fire stream onto the fire. The air compressor 13 has its suction 112 connected to a filtered air inlet 114. A conduit means 116 containing a control valve 136 is provided for supplying a mixture of foam concentrate and water to the suction 112 of the compressor 13. The means for supplying the liquid/foam mixture to the compressor suction 112 comprises the foam proportioner 15 which may be of a type disclosed in U.S. Pat. No. 4,633,895. This type of foam proportioner is constructed and arranged for mixing a concentrated foam liquid solution with water in a predetermined proportion for use in a foam-water firefighting system. Conduit 104 contains a control valve 105 and the arrangement is such that when valve 105 is closed, a water supply line 115 directs the water out of the water delivery conduit 104 and delivers it to the proportioner 15 which mixes said water at a predetermined proportion with a foam concentrate and delivers the mixture to the suction 112 of air compressor 13. The foam-like mixture delivered to air compressor 13 helps in achieving a good edge and peripheral sealing as well as cooling and lubrication of he compressor vanes.

Foam proportioner 15 is supplied with the foam concentrate from a foam supply tank 120 by way of a suitable piping connection 122. Various suitable foam concentrates are available in the art of use in firefighting applications, such as those available from Monsanto Corporation.

The discharge from the air compressor 13 is delivered through a conduit means 130 back to the water delivery conduit 104 at a location downstream of valve 105 and upstream of discharge valve 106. The direction of the flow through conduit 130 as described above is controlled by a check valve 131.

The system can be arranged to deliver water only to fire hose 108 by opening valve 105 and closing valve 136.

It will be apparent that various changes may be made in the construction and arrangement of parts without departing from the scope of the invention. For example, the transmission means may comprise a chain and sprocket drive means equivalent to the gear drive means disclosed. Accordingly, it is not desired to be limited except as required by the following claims.

What is claimed is:

1. An air supply system for firefighting apparatus including means for delivering a fire stream onto a fire, comprising:

a fire pump for delivering water under pressure to the fire stream, said fire pump having a pump shaft means, a rotary vane compressor for delivering air under pressure to the water delivered to the fire stream, said compressor having a compressor shaft means, a suction and a discharge, transmission means for driving both said pump and said compressor and including a gear box, means for mounting said pump adjacent said gear box with said pump shaft means having a shaft portion rotatably mounted in said gear box, means for mounting said compressor adjacent said gear box with said compressor shaft means having a shaft portion rotatably mounted in said gear box, said transmission means comprising an input shaft rotatably mounted in said gear box, an input gear mounted on said input shaft for rotation therewith, an intermediate gear rotatably mounted in said gear box to be driven by said input gear, a pump drive gear for causing rotation of said pump shaft means, said pump drive gear being mounted on said pump shaft portion to be driven by said intermediate gear, a compressor drive gear for causing rotation of said compressor shaft means, said compressor drive gear being mounted on said compressor shaft portion to be driven by said intermediate gear, conduit means for connecting said compressor discharge to the fire stream, and means for supplying a liquid foam to said compressor suction.

2. An air supply system according to claim 1 wherein said input shaft is rotatably mounted in said gear box and includes a spline shaft portion; a cylindrical shaft portion and an input flange portion, and including an output member rotatably mounted in said gear box in axial alignment with said input shaft and including a spline shaft portion, a cylindrical shaft portion and an output flange portion, said input gear comprising a sliding gear slidably mounted on said spline shaft portion of said input shaft at an internal spline portion thereof and having externally facing gear teeth, said sliding gear being constructed and arranged to cooperate with said spline shaft portions of said input shaft and said output member to slide between a road position wherein said internal spline portion thereof is in engagement with both the spline shaft portions of said input shaft and said output member and a pump position wherein said internal spline portion thereof only engages the spline shaft portion of the input shaft, the gear teeth of said sliding gear engaging the gear teeth of said intermediate gear in said pump position of said sliding gear.

3. An air supply system according to claim 1 wherein said means for supplying liquid foam to said compressor suction comprises a liquid proportioner, and including means for supplying water from said fire pump to said proportioner, means for supplying a foam chemical to said proportioner, and conduit means for delivering a mixture of liquid and foam chemical from said proportioner to said compressor suction.

4. An air supply system according to claim 1 including clutch means for engaging and disengaging said compressor shaft means and said compressor drive gear.

5. An air supply system according to claim 4 wherein said clutch means is air operated and includes diaphragm means responsive to air pressure.

6. A compressed air and foam supply system for firefighting apparatus comprising:

means for delivering a fire stream onto a fire, a fire pump for delivering water under pressure to said fire stream delivery means and having a suction and a discharge, conduit means for directing the discharge of said fire pump to the upstream end of said fire stream delivery means, an air compressor connected in said conduit means for discharging a fluid at a firefighting pressure and having an air inlet, a water foam suction and a discharge, and a foam proportioner for delivering a mixture of water and a foam producing chemical to said water/foam suction of said air compressor whereby the air compressor delivers a water/foam/air mixture into said conduit means.

7. A system according to claim 6 wherein said air compressor is a rotary vane compressor, said mixture being delivered to said compressor to provide lubrication, sealing and cooling of the vanes thereof.

8. A compressed air and foam supply system for firefighting apparatus comprising:

means for delivering a fire stream onto a fire, a fire pump for delivering water under pressure to said fire stream delivery means and having a suction and a discharge, conduit means for directing the discharge of said fire pump to the upstream end of said fire stream delivery means, a rotary vane air compressor connected in said conduit means for discharging a fluid at a firefighting pressure and having an air inlet, a liquid suction and a discharge, and means for delivering water from said conduit means to said liquid suction of said air compressor for the lubrication, sealing and cooling of the vanes of said compressor.

9. An air supply system for firefighting apparatus including means for delivering a fire stream onto a fire, comprising:

a fire pump for delivering water under pressure to the fire stream, said fire pump having a pump shaft means, a compressor for delivering compressed air at a relatively high pressure of at least several atmospheres to the water delivered to the fire stream, said compressor having a compressor shaft means, transmission means for driving both said pump and said compressor and including a casing means, means for mounting said pump directly on said casing means with said pump shaft means having a shaft portion rotatably mounted in said casing means, means for mounting said compressor directly on said casing means with said compressor shaft means having a shaft portion rotatably mounted in said casing means, said transmission means comprising an input shaft rotatably mounted in said casing means, an input drive means mounted on said input shaft for rotation therewith, a pump drive means for causing rotation of said pump shaft means, said pump drive means being constructed and arranged to drive said pump shaft portion and to be driven by said input drive means, a compressor drive means for causing rotation of said compressor shaft means, said compressor drive means being constructed and arranged to drive said compressor shaft portion and to be driven by said input drive means, and clutch means for engaging and disengaging said compressor shaft means and said compressor drive means for the selective use of said compressor.

10. An air supply system according to claim 9 wherein said clutch means is air operated and includes diaphragm means responsive to air pressure.

11. An air supply system according to claim 9 wherein said mounting means for said compressor is an integral part of said casing means.

12. An air supply according to claim 9 wherein said pump delivers water to the fire steam at a desired operating pressure of multiple atmospheres, said compressor being constructed and arranged to deliver air to the water delivered to the fire stream at a pressure at least as high as said operating pressure.

13. An air supply system according to claim 12 wherein said operating pressure is at least about 100 to 150 psi.

14. An air supply system according to claim 9 wherein said mounting means for said pump is an integral part of said casing means.

15. An air supply system according to claim 14 wherein said transmission means comprises a split shaft gear box and said casing means includes a first housing portion for containing said compressor and a second housing portion for containing said pump.

16. An air supply system according to claim 15 wherein said input drive means comprises an input gear, said transmission means includes an intermediate gear mounted to be driven by said input gear, said pump drive means comprises a pump drive gear mounted on said pump shaft portion to be driven by said intermediate gear, and said compressor drive means comprises a compressor drive gear mounted on said compressor shaft portion to be driven by said intermediate gear.

17. An air supply system according to claim 16 wherein said input shaft is rotatably mounted in said gear box and includes a spline shaft portion, a cylindrical shaft portion and an input flange portion, an including an output member rotatably mounted in said gear box in axial alignment with said input shaft and including a spline shaft portion, a cylindrical shaft portion and an output flange portion, said input gear comprising a sliding gear slidably mounted on said spline shaft portion of said input shaft at an internal spline portion thereof and having externally facing gear teeth, said sliding gear being constructed and arranged to cooperate with said spline shaft portions of said input shaft and said output member to slide between a road position wherein said internal spline portion thereof is in engagement with both the spline shaft portions of said input shaft and said output member and a pump position wherein said internal spline portion thereof only engages the spline shaft portion of the input shaft, the gear teeth of said sliding gear engaging the gear teeth of said intermediate gear in said pump position of said sliding gear.

*18. An air supply system for firefighting apparatus including means for delivering a fire stream onto a fire, comprising:*

*a fire pump for delivering water under pressure to a fire stream, said fire pump having a pump shaft means and a pump outlet,*

*a first conduit having a first end and connected to said pump outlet and a second end provided with a nozzle for delivering said fire stream onto a fire,*

*a compressor for delivering compressed air and foam at a relatively high pressure of at least several atmospheres to the water delivered to the fire stream, said compressor having a compressor shaft means and a compressor outlet,*

*a second conduit having a first end connected to said compressor outlet and a second end connected to a connection portion of said first conduit for injecting said compressed air into said first conduit so that the water downstream of said connection portion has a higher air content than fluid upstream of said connection portion,*

*transmission means for driving both said pump and said compressor and including a casing means,*

*means for mounting said pump directly on said casing means with said pump shaft means having a shaft portion rotatably mounted in said casing means,*

*means for mounting said compressor directly on said casing means with said compressor shaft means having a shaft portion rotatable mounted in said casing means,*

*said transmission means comprising,*

*an input shaft rotatable mounted in said casing means,*

*an input drive means mounted on said input shaft for rotation therewith.*

*a pump drive means for causing rotation of said pump shaft means, said pump drive means being constructed and arranged to drive said pump shaft portion and to be driven by said input drive means,*

*a compressor drive means for causing rotation of said compressor shaft means, said compressor drive means being constructed and arranged to drive said compressor shaft portion and to be driven by said input drive means,*

*and clutch means for engaging and disengaging said compressor shaft means and said compressor drive means for the selective use of said compressor.*

*19. The air supply system of claim 18 in which the water in said first conduit upstream of said connection portion has an operating pressure of at least about 100 to 150 psi.*

*20. The air supply system of claim 19, in which said fire pump operates at about 1000–2000 GPM and said compressor operates at a pressure equal to or in excess of the water pressure.*

*21. The air supply system of claim 18 in which said input drive means simultaneously drives both said pump drive means and said compressor drive means and drives said compressor at a higher RPM than said pump drive means.*

*22. The air supply system of claim 21 in which said compressor drive means is always rotating when said pump drive means is rotating and said clutch means is selectively operable to engage or disengage said compressor drive means from said compressor shaft means.*

*23. An air supply system and firetruck combination including means for delivering a fire stream onto a fire, comprising:*

*an engine mounted in a firetruck for driving said firetruck,*

*a fire pump mounted in said firetruck for delivering water under pressure to a fire stream, said fire pump having a pump shaft means,*

*a compressor mounted in said firetruck for delivering compressed air and foam at a relatively high pressure of at least several atmospheres to the water delivered to the fire stream, said compressor having a compressor shaft means,*

*transmission means mounted in said firetruck for driving both said pump and said compressor and including a casing means,*

*means for mounting said pump directly on said casing means with said pump shaft means having a shaft portion rotatably mounted in said casing means,*

*means for mounting said compressor directly on said casing means with said compressor shaft means having a shaft portion rotatably mounted in said casing means,*

*said transmission means comprising,*

*an input shaft rotatable mounted in said casing means and connected to said engine,*

*an input drive means mounted on said input shaft for rotation therewith,*

*a pump drive means for causing rotation of said pump shaft means, said pump drive means being constructed and arranged to drive said pump shaft portion and to be driven by said input drive means,*

*a compressor drive means for causing rotation of said compressor shaft means, said compressor drive means being constructed and arranged to drive said compressor shaft portion and to be driven by said input drive means,*

*and clutch means for engaging and disengaging said compressor shaft means and said compressor drive means for the selective use of said compressor.*

*24. The combination of claim 23 in which said input drive means simultaneously drives both said pump drive means and said compressor drive means and drives said compressor drive means at a higher RPM than said pump drive means.*

*25. The combination of claim 24 in which said compressor drive means is always rotating when said pump drive means is rotating and said clutch means is selectively operable to engage or disengage said compressor drive means from said compressor shaft means.*

* * * * *